US005898045A

United States Patent [19]

Schwarte et al.

[11] Patent Number: 5,898,045

[45] Date of Patent: Apr. 27, 1999

[54] AQUEOUS POLYMER DISPERSIONS, AQUEOUS COATING MATERIALS BASED ON THESE POLYMER DISPERSIONS, AND PROCESSES FOR THE FINISHING OF MOTOR-VEHICLE BODIES

[75] Inventors: Stephan Schwarte, Emsdetten; Dietmar Chmielewski; Georg Wigger, both of Münster, all of Germany

[73] Assignee: BASF Coatings AG, Muenster-Hiltrup, Germany

[21] Appl. No.: 08/656,350

[22] PCT Filed: Dec. 1, 1994

[86] PCT No.: PCT/EP94/03991

§ 371 Date: Jun. 13, 1996

§ 102(e) Date: Jun. 13, 1996

[87] PCT Pub. No.: WO95/16720

PCT Pub. Date: Jun. 22, 1995

[30] Foreign Application Priority Data

Dec. 14, 1993 [DE] Germany ............................ 43 42 551

[51] Int. Cl.[6] .............................. C08K 3/20; C08L 63/02

[52] U.S. Cl. ......................... 523/423; 523/407; 523/412; 525/530

[58] Field of Search .................................... 523/407, 410, 523/412, 423; 525/922, 523, 530

[56] References Cited

U.S. PATENT DOCUMENTS 4,294,737 10/1981 Sekmakas et al. ...................... 525/231

4,564,648 1/1986 Huybrechts et al. .................. 523/423

FOREIGN PATENT DOCUMENTS 469646 2/1992 European Pat. Off. .

A1 0 469 646 2/1992 European Pat. Off. .

58-198513 11/1983 Japan .

OTHER PUBLICATIONS

Patent Abstracts of Japan, vol. 8, No. 34 (C–210), abstract of JP, A, 58–198513, Nov. 18, 1983.

*Primary Examiner*—Robert Dawson
*Assistant Examiner*—D. Aylward

[57] ABSTRACT

An aqueous polymer dispersion, comprising an at least 20% neutralized, free-radical polymerized product of A and B in a ratio of one part A to from 0.5 to 9.0 parts B by weight; wherein A consists essentially of from 2.5 to 13% by weight of at least one acid group-containing, ethyleneically unsaturated monomer and from 87 to 97.5% by weight of at least one ethylenically unsaturated monomer that is free from acid groups, and further wherein B is a reaction product of at least one compound containing at least 1.5 epoxide groups per molecule on average and at least one member of the group consisting of:

(1) mixtures of ethylenically unsaturated monocarboxylic acids, saturated fatty acids, and monoesters of ethylenically unsaturated dicarboxylic acids and saturated fatty alcohols; and (2) mixtures of saturated fatty acids and monoesters of ethylenically unsaturated dicarboxylic acids and saturated fatty alcohol.

15 Claims, No Drawings

AQUEOUS POLYMER DISPERSIONS, AQUEOUS COATING MATERIALS BASED ON THESE POLYMER DISPERSIONS, AND PROCESSES FOR THE FINISHING OF MOTOR-VEHICLE BODIES

FIELD OF THE INVENTION

The invention relates to aqueous polymer dispersions, to aqueous coating materials based on these polymer dispersions, and to a process for the finishing of motor-vehicle bodies.

BACKGROUND AND SUMMARY OF THE INVENTION

Aqueous polymer dispersions and aqueous coating materials based on aqueous polymer dispersions are known. EP-A-469,646, for example, describes aqueous polymer dispersions of hybrid polymers, which are used for the production of aqueous coating materials. The hybrid polymers are prepared by polymerizing ethylenically unsaturated monomers in the presence of an epoxide-containing reaction product of n mol of a bisepoxide compound and n-1 mol of a dicarboxylic acid, which product has itself been reacted with unsaturated fatty acids. Following neutralization of the acid groups contained in the polymer, the hybrid polymer is dispersible in water. From the aqueous polymer dispersions prepared in this way it is possible to product aqueous coating materials which, disadvantageously, give coating films which have a tendency to yellow, especially when relatively long baking times and/or relatively high baking temperatures are employed.

The object of the present invention is to provide aqueous polymer dispersions from which it is possible to produce aqueous coating materials which can be used to produce coating films in which the above-described disadvantages are reduced or absent and which additionally have good surface properties, in particular a high acid resistance and scratch resistance.

This object is surprisingly achieved by the provision of aqueous polymer dispersions which can be prepared in that (A) 1.0 part by weight of a mixture of (a1) from 2.5 to 13% by weight of an ethylenically unsaturated monomer which contains acid groups, or of a mixture of such monomers, and (a2) from 87 to 97.5% by weight of an ethylenically unsaturated monomer which is free from acid groups, or of a mixture of such monomers, the sum of the percentages by weight of components (a1) and (a2) always being 100% by weight, are subjected to free-radical polymerization in the presence of (B1) from 0.5 to 9.0 parts by weight of a reaction product of (b1) a compound which contains on average per molecule at least 1.5 epoxide groups, or a mixture of such compounds, and (b2) a mixture of (b21) an ethylenically unsaturated monocarboxylic acid having 3–8 carbon atoms, or a mixture of such monocarboxylic acids, and (b22) a saturated fatty acid, or a mixture of saturated fatty acids, or in the presence of (B2) from 0.5 to 9.0 parts by weight of a reaction product of component (b1) and (b3) a monoester of an ethylenically unsaturated dicarboxylic acid and a saturated fatty alcohol, or a mixture of such monoesters, or in the presence of (B3) from 0.5 to 9.0 parts by weight of a reaction product of component (b1) and (b4) a mixture of components (b21), (b22) and (b3) or a mixture of components (b21) and (b3) or a mixture of components (b22) and (b3).

and the resulting polymerization product is converted, during or after the neutralization of at least 20 percent of the acid groups contained in the polymerization product, into an aqueous polymer dispersion, components (b1), (b2), (b3) and (b4) being reacted with one another in proportions such that components (B1), (B2) and (B3) contain on average per molecule not more than 0.25 epoxide groups and at least 0.4 ethylenically unsaturated groups which derive from component (b21) and/or component (b3).

DETAILED DESCRIPTION

As component (a1) it is possible in principle to employ any ethylenically unsaturated monomer which contains acid groups, or a mixture of such monomers. Examples of ethylenically unsaturated monomers which contain acid groups are acrylic acid, methacrylic acid, maleic acid and fumaric acid. As component (a1) it is preferred to employ methacrylic acid or acrylic acid or a mixture of methacrylic acid and acrylic acid.

As component (a2) it is possible to employ any ethylenically unsaturated monomer which is free from acid groups, or a mixture of such monomers. Examples of ethylenically unsaturated monomers which are free from acid groups are: (cyclo)alkyl (meth)acrylates having 1–12 carbon atoms in the (cyclo)alkyl radical, for example methyl (meth)acrylate, ethyl (meth)acrylate, propyl (meth)acrylate, isopropyl (meth)acrylate, butyl (meth)acrylate, 2-ethylhexyl (meth) acrylate, octyl (meth)acrylate, isobornyl (meth)acrylate, dodecyl (meth)acrylate and cyclohexyl (meth)acrylate; (cyclo)alkyl esters of maleic acid, fumaric acid acid and itaconic acid, for example dimethyl maleate, diethyl maleate, diethyl fumarate, dipropyl maleate, dibutyl maleate and dibutyl fumarate; (meth)acrylates containing ether groups, for example 2-methoxyethyl (meth)acrylate, 2-ethoxyethyl (meth)acrylate and 3-methoxypropyl (meth) acrylate; hydroxyalkyl (meth)-acrylates, for example 2-hydroxyethyl (meth)acrylate, 2-hydroxypropyl (meth) acrylate, 4-hydroxybutyl (meth)-acrylate, 6-hydroxyhexyl (meth)acrylate, hydroxycyclohexyl (meth)acrylate, hydroxypolyethylene glycol (meth)acrylates, and hydroxypolypropylene glycol (meth)acrylates; ethylenically unsaturated aromatic compounds such as styrene, vinyltoluene and α-methylstyrene, and other ethylenically unsaturated monomers such as, for example, (meth)acrylamide, (meth) acrylonitrile, N-methylol(meth)acrylamide, vinyl acetate, vinyl propionate and vinylpyrrolidone.

Component (A) is composed of 2.5–13% by weight, referably from 5 to 10% by weight, of component (a1) and 87–97.5% by weight, preferably from 90 to 95% by weight, of component (a2), the sum of the percentages by weight of components (a1) and (a2) always being 100% by weight. Components (a1) and (a2) are preferably selected such that the polymerization of component (A) alone leads to a polymer having an acid number of from 23 to 100, preferably from 40 to 70, a hydroxyl number of from 30 to 200, preferably from 40 to 140, and a glass transition temperature $T_G$ of from −40 to +70° C., preferably from −20 to +50° C.

Component (B1) is a reaction product of component (b1) and component (b2), which contains on average per molecule not more than 0.25 epoxide groups and at least 0.4, preferably from 0.5 to 1.8, particularly preferably from 0.8 to 1.3, ethylenically unsaturated groups deriving from component (b21). Component (b1) is preferably free from epoxide groups.

As component (b1) it is possible to employ any compound which contains on average per molecule at least 1.5 epoxide groups, or a mixture of such compounds. The compound which contains on average per molecule at least 1.5 epoxide groups may be, for example, a diglycidyl ether of bisphenol A, an epoxide-containing oligomer of epichlorohydrin and bisphenol A having a number-average molecular weight of 300 to 2000, an epoxide-containing oligomer of epichlorohydrin and hydrogenated bisphenol A having a number-average molecular weight of from 300 to 2000, 1,4-butanediol diglycidyl ether, polypropylene glycol diglycidyl ether, bis(2,3-epoxy-6-methyl-cyclohexylmethyl) adipate and 3,4-epoxycyclohexylmethyl 3,4-epoxycyclohexanecarboxylate.

As component (b1) it is preferred to employ a reaction product of (b11) n mol of a compound which contains on average per molecule from 1.5 to 2.5 epoxide groups, or of a mixture of such compounds, and (b12) n−1 mol of a dicarboxylic acid having from 2 to 40 carbon atoms, or of a mixture of such dicarboxylic acids, where n is 2–10.

As component (b11) it is possible to employ any compound which contains on average per molecule from 1.5 to 2.5 epoxide groups, or a mixture of such compounds. The epoxide-containing compounds listed above can be employed as component (b11).

As component (b12), a dicarboxylic acid having from 2 to 40 carbon atoms, or a mixture of such dicarboxylic acids, is employed. Examples of dicarboxylic acids having from 2 to 40 carbon atoms are: oxalic acid, adipic acid, isophthalic acid, phthalic acid, hexahydrophthalic acid, sebacic acid, dodecanedioic acid, azelaic acid and dimerized fatty acids.

As component (b1) it is preferred to employ compounds which contain no aromatic structural elements.

As component (b2) a mixture is employed of (b21) an ethylenically unsaturated monocarboxylic acid having from 3 to 8, preferably from 3 to 6, carbon atoms, or a mixture of such monocarboxylic acids, and (b22) a saturated fatty acid or a mixture of saturated fatty acids.

Examples of ethylenically unsaturated monocarboxylic acids which can be employed as component (b21) are: acrylic acid, methacrylic acid and ethacrylic acid.

As component (b21) it is preferred to employ acrylic acid or methacrylic acid or a mixture of acrylic and methacrylic acid. As component (b22) a saturated fatty acid is employed, preferably a saturated fatty acid having from 14 to 24, particularly preferably having from 16 to 20, carbon atoms, or a mixture of such saturated fatty acids. Examples of saturated fatty acids which can be employed are: myristic acid, palmitic acid, stearic acid, arachidic acid, behenic acid and lignoceric acid.

Component (B1) is prepared by reacting components (b1) and (b2) with one another in a proportion such that the reaction product contains on average not more than 0.25 epoxide groups and at least 0.4, preferably from 0.6 to 1.8, particularly preferably from 0.8 to 1.3, ethylenically unsaturated groups deriving from component (b21). The reaction between components (b1) and (b2) is carried out by well-known methods of organic chemistry and is preferably implemented in an organic solvent at temperatures of from 60 to 200° C. The organic solvent employed should be miscible with water. It is also possible to employ a catalyst which catalyzes the reaction between epoxide groups and carboxyl groups. Such catalysts are well known. Examples are p-toluenesulfonic acid, basic amines, ammonium salts and phosphonium salts.

Component (B2) can be obtained by reacting component (b1) with (b3), a monoester of an ethylenically unsaturated dicarboxylic acid and a saturated fatty alcohol, or a mixture of such monoesters, in a ratio such that the reaction product contains not more than 0.25 epoxide groups and at least 0.4, preferably from 0.6 to 1.8, particularly preferably from 0.8 to 1.3, ethylenically unsaturated groups deriving from Component (b3). Component (B2) is preferably free from epoxide groups.

Component (b3) can be prepared by simple esterification of an ethylenically unsaturated dicarboxylic acid with a saturated fatty alcohol. Examples of ethylenically unsaturated dicarboxylic acids which can be employed are maleic acid, fumaric or itaconic acid or the anhydrides of maleic acid, fumaric acid and itaconic acid. The saturated fatty alcohol employed is preferably a saturated fatty alcohol having from 12 to 26, particularly preferably from 12 to 18, carbon atoms. Examples of fatty alcohols which can be employed are myristyl alcohol, palmityl alcohol, stearyl alcohol, arachidyl alcohol, behenyl alcohol and lignoceryl alcohol.

Component (B3) can be prepared by reacting component (b1) with (b4) a mixture of components (b21), (b22) and (b3) or a mixture of components (b21) and (b3) or a mixture of components (b22) and (b3), the composition of component (b4) and the weight ratio in which components (b1) and (b4) are reacted with one another being selected such that the reaction product of component (b1) and (b4) contains not more than 0.25 epoxide groups and at least 0.4, preferably from 0.6 to 1.8, particularly preferably from 0.8 to 1.3, ethylenically unsaturated groups deriving from component (b21) and/or component (b3). Component (B3) is preferably free from epoxide groups.

The aqueous polymer dispersions provided in accordance with the invention can be prepared by subjecting 1.0 part by weight of component (A) to free-radical polymerization in the presence of from 0.5 to 9.0, preferably from 1.0 to 5.0, parts by weight of component (B1) or in the presence of from 0.5 to 9.0, preferably from 1.0 to 5.0, parts by weight of component (B2) or in the presence of from 0.5 to 9.0, preferably from 1.0 to 5.0, parts by weight of component (B3) and converting the resulting reaction product, during or after the neutralization of at least 20 percent of the acid groups contained in the reaction product, into an aqueous polymer dispersion.

The polymerization can be carried out in an organic solvent or solvent mixture in the presence of at least one free-radical initiator. The organic solvents and free-radical polymerization initiators which can be employed are those which are the organic solvents and free-radical polymerization initiators which are well known for solution polymerization.

Solvents which can be used are butylglycol, 2-methoxyropanol, n-butanol, methoxybutanol, n-propanol, ethylene glycol monoethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether and 3-methyl-3-methoxybutanol.

Examples of polymerization initiators which can be used are free-radical initiators such as, for example, benzoyl peroxide, azobisisobutyronitrile and t-butyl perbenzoate.

The polymerization is preferably carried out at a temperature of from 80 to 160° C., particularly preferably at from 120 to 160° C.

After the end of the polymerization the resulting polymerization product is converted, during or after the neutralization of at least 20 percent of the acid groups contained in the polymerization product, into an aqueous polymer dispersion. Both organic bases and inorganic bases can be employed to neutralize the acid groups, with tertiary amines such as, for example, dimethylethanolamine, triethylamine, tripropylamine and tributylamine preferably being employed.

The solids content of the aqueous polymer dispersions provided in accordance with the invention is usually from 20 to 60% by weight, preferably between 35 and 55% by weight.

The aqueous polymer dispersions according to the invention may be used for the production of aqueous coating materials. The aqueous coating materials containing the polymer dispersions according to the invention may contain a crosslinking agent. Suitable crosslinking agents are amino resins containing N-methylol and/or N-methylol ether groups, and blocked polyisocyanates. It is particularly preferred to employ melamine resins as crosslinking agents, very particular preference being given to those melamine resins which contain per molecule from 4 to 6 methylol groups, with at least 3 of these methylol groups being etherified with a short-chain alkanol such as, for example, methanol or butanol. Examples of blocked polyisocyanates which can be employed are polyisocyanates blocked with methyl ethyl ketoxime.

The crosslinking agents are employed in a quantity such that the ratio of equivalents between the reactive groups present in the polymerization product and the reactive groups present in the crosslinking agent is between 0.7 and 1.5.

Depending on the intended application of the coating materials produced from the aqueous polymer dispersions provided in accordance with the invention, the coating materials may contain a large number of other additives which are required for the particular intended application, for example pigments, dyes, pigment dispersion auxiliaries, rheology auxiliaries, UV stabilizers, light stabilizers and the like.

Aqueous coating materials which contain as binder the polymerization product present in the aqueous polymer dispersions provided in accordance with the invention are particularly suitable for the production of aqueous coating materials which are suitable for the finishing of motor-vehicle bodies. They may be employed in processes for the finishing of motor-vehicle bodies, in which an electrodeposition coat, a filler coat and a one-layer pigmented topcoat or a two-layer topcoat consisting of a pigmented basecoat and a transparent topcoat are coated over one another and are baked in succession in two or more baking steps, for the production of the filler coat, the one-layer pigmented topcoat, the pigmented basecoat or the transparent topcoat. Using the aqueous polymer dispersions provided in accordance with the invention it is possible in particular to produce transparent aqueous coating materials which are very particularly well suited to the production of the transparent topcoat in the above-described process for the finishing of motor-vehicle bodies. Transparent topcoats produced using these coating materials are distinguished, in comparison with the topcoats prepared in accordance with EP-A-469,646, by an increased resistance to yellowing. Moreover, coats which have been produced using aqueous coating materials based on the polymer dispersions provided in accordance with the invention have good surface properties, in particular high acid resistance and scratch resistance.

The examples which follow illustrate the invention in more detail. All parts and percentages are to be understood as by weight unless expressly stated otherwise.

A) Preparation of Aqueous Polymer Dispersions According to the Invention

Polymer Dispersion I 237.4 g of dimerized fatty acid (Pripol® 1009 from Unilever), 150.8 g of 3,4-epoxycyclohexylmethyl 3,4-epoxycyclohexylcarboxylate (Araldite CY-179 from Ciba Geigy), 42.1 g of stearic acid, 10.4 g of methacrylic acid, 82.6 g of 1-methoxy-2-propanol and 0.7 g of Cr (III) 2-ethylhexanoate are mixed intensively in a 2-liter reactor with stirrer, thermometer, reflux condenser and two feed vessels. The first feed vessel is filled with 70 g of diethylene glycol monobutyl ether and the second feed vessel is filled with a mixture of 86.8 g of styrene, 31.2 g of 2-hydroxypropyl methacrylate, 59.3 g of butyl methacrylate, 14.4 g of acrylic acid and 8.3 g of dicumyl peroxide.

Reactor and feed vessels are then flushed with nitrogen, and the contents of the reactor are heated under nitrogen to 120° C. This temperature is maintained for 3 hours. The contents of the first feed vessel are then added and the temperature in the reactor is raised to 130° C. After this the contents of the second feed vessel are added over the course of one hour and the temperature is maintained at 130° C. for a further 3 hours. As soon as the contents of the reactor have cooled to 100° C., 14.3 g of N,N-dimethylethanolamine and afterwards, over the course of 2 hours, 922 g of deionized water are added.

An aqueous dispersion is obtained having a solids content (1 h 130° C.) of 37% by weight.

Polymer dispersion II

Preparation of a Monoester From an Ethylenically Unsaturated Dicarboxylic Acid and a Saturated Fatty Alcohol 749 parts by weight of a saturated fatty alcohol (Nafol® 12, 14®, Condea Chemie), 370 parts by weight of maleic anhydride and 1.1 parts by weight of hydroquinone monomethyl ether are weighed out and heated to 90° C. in a 4 liter steel reactor fitted with stirrer, thermometer, oil heating and reflux condenser.

The reaction mixture is held at 90° C. until an acid number $\leqq 189$ is reached.

Preparation of Polymer Dispersion II 66.1 parts by weight of the monoester prepared by the procedure described above, together with 237.4 g of dimerized fatty acid (Pripol® 1009 from Unilever), 150.8 g of epoxycyclohexylmethyl 3,4-epoxycyclohexanecarboxylate (Araldite CY-179 from Ciba Geigy), 11.5 g of stearic acid, 184.5 g of 1-methoxy-2-propanol and 0.46 g of Cr (III) 2-ethylhexanoate, are mixed intensively in a 2 liter reactor with stirrer, thermometer, reflux condenser and 2 feed vessels. The first feed vessel is filled with 70 g of diethylene glycol monobutyl ether and the second feed vessel is filled with a mixture of 86.8 g of styrene, 31.2 g of 2-hydroxypropyl methacrylate, 59.3 g of butyl methacrylate, 14.4 g of acrylic acid and 8.3 g of dicumyl peroxide.

Reactor and feed vessels are then flushed with nitrogen, and the contents of the reactor are heated under nitrogen to 120° C. This temperature is maintained for 3 hours. The contents of the first feed vessel are then added and the temperature in the reactor is raised to 130° C. After this the contents of the second feed vessel are added over the course of one hour and the temperature is then maintained at 130° C. for a further 3 hours. As soon as the contents of the reactor have cooled to 100° C., 14.3 g of N,N-dimethylethanolamine and afterwards, over the course of 2 hours, 922 g of deionized water are added. A dispersion is obtained having a solids content (1 h, 130° C.) of 33% by weight.

B Preparation of Clearcoats According to the Invention

Clearcoat I 80.6 parts by weight of polymer dispersion I are mixed thoroughly with 14.2 parts by weight of melamine resin (Cymel 327 from American Cyanamid, 90%), 3.55 parts by weight of diethylene glycol monobutyl ether and 1.65 parts by weight of deionized water. The clearcoat according to the invention is adjusted to a flow time of 25 s in a DIN 4 flow cup.

Clearcoat II

Clearcoat II is prepared like clearcoat I, the only difference being that 90.36 parts by weight of polymer dispersion II are employed instead of 80.6 parts by weight of polymer dispersion I.

C) Preparation of a Comparison Clearcoat 76.4 parts by weight of a dispersion prepared in accordance with EP-A-469 646, Example 13, are mixed thoroughly with 14.2 parts by weight of melamine resin (Cymel 327 from American Cyanamid, 90%), 355 parts by weight of diethylene glycol monobutyl ether and 5.85 parts by weight of deionized water. The comparison clearcoat is adjusted to a flow time of 25 s in the DIN 4 flow cup.

D) Preparation of 2-layer Topcoats

A commercially available, aqueous basecoat containing aluminum pigment is sprayed at an atmospheric humidity of about 65% onto steel panels coated with a commercially available electrodeposition coating material and a commercially available filler, the coatings are flashed off for 5 minutes at room temperature, pre-dried at 60° C. for 15 minutes and then coated over with the clearcoats prepared in accordance with B) and C) (dry film thickness 40–45 μm). After a further drying time of 5 minutes at room temperature and 10 minutes at 80° C. the basecoats and clearcoats are baked together in a circulating-air oven at 150° C. for 30 minutes. Afterwards the finishes produced in this way are overbaked once more for 30 minutes at 140° C. and for 30 minutes at 155° C. Subsequently the yellowing index, which is a measure of the yellowing caused by the overbaking, is determined in accordance with DIN 6167. The results can be taken from the following table:

Finish produced with

| Yellowing index after overbaking at | Clearcoat I | Clearcoat II | Comparison clearcoat |
|---|---|---|---|
| 140° C. | 1.60 | 1.42 | 2.13 |
| 155° C. | 2.20 | 2.00 | 4.60 |

The finishes produced using the clearcoats according to the invention have consequently been yellowed to a lesser extent by the overbaking than the finish produced with the comparison clearcoat.

We claim:

1. An aqueous polymer dispersion, comprising an at least 20% neutralized, free-radical polymerized product of A and B in a ratio of one part A to from 0.5 to 9.0 parts B by weight; wherein A consists essentially of from 2.5 to 13% by weight of at least one acid group-containing, ethyleneically unsaturated monomer and from 87 to 97.5% by weight of at least one ethylenically unsaturated monomer that is free from acid groups, and further wherein B is a reaction product of at least one compound containing at least 1.5 epoxide groups per molecule on average and at least one member of the group consisting of: (1) mixtures of ethylenically unsaturated monocarboxylic acids, saturated fatty acids, and monoesters of ethylenically unsaturated dicarboxylic acids and saturated fatty alcohols; and (2) mixtures of saturated fatty acids and monoesters of ethylenically unsaturated dicarboxylic acids and saturated fatty alcohols;

and still further wherein

B contains not more than 0.25 epoxide groups and at least 0.4 ethylenically unsaturated groups per molecule on average.

2. An aqueous polymer dispersion according to claim 1, wherein the polymerization of alone would result in a polymer having an acid number of from 23 to 100, a hydroxyl number of from 30 to 200, and a glass transition temperature $T_g$ of from −40 to +70° C.

3. An aqueous polymer dispersion according to claim 1, wherein the compound containing at least 1.5 epoxide groups per molecule on average is a reaction product of n mol of at least one compound that contains on average per molecule from 1.5 to 2.5 epoxide groups, and n−1 mol of at least one dicarboxylic acid having from 2 to 40 carbon atoms, wherein n is 2–10.

4. An aqueous polymer dispersion according to claim 1, wherein the ethylenically unsaturated monocarboxylic acid is selected from the group consisting of acrylic acid, methacrylic acid, and mixtures thereof.

5. An aqueous polymer dispersion according to claim 1, wherein the saturated fatty acid has from 14 to 24 carbon atoms.

6. An aqueous polymer dispersion according to claim 1, wherein the monoester is a monoester of maleic acid, fumaric acid, or itaconic acid and a saturated fatty alcohol having from 12 to 26 carbon atoms.

7. An aqueous polymer dispersion according to claim 1, wherein the reaction product B contains on average per molecule from 0.6 to 1.8 ethylenically unsaturated groups.

8. Aqueous coating materials comprising a polymer dispersion according to claim 1.

9. A process for finishing a surface, comprising the steps of applying, in successive layers, an electrodeposition coat, a filler coat, and a one-layer pigmented topcoat or a two-layer topcoat consisting of a pigmented basecoat and a transparent topcoat; and baking the applied layers in succession in two or more baking steps, wherein at least one member of the group consisting of the filler coat, the one-layer pigmented topcoat, the pigmented basecoat, and the transparent topcoat comprises an aqueous coating material according to claim 8.

10. A process according to claim 9, wherein the transparent topcoat comprises an aqueous coating material according to claim 8.

11. An aqueous polymer dispersion according to claim 2, wherein the polymer would have an acid number of from 40 to 70, a hydroxyl number of from 40 to 140, and a glass transition temperature $T_g$ of from −20 to +50° C.

12. An aqueous polymer dispersion according to claim 5, wherein the saturated fatty acid has from 16 to 20 carbon atoms.

13. An aqueous polymer dispersion according to claim 6, wherein the saturated fatty alcohol has from 12 to 18 carbon atoms.

14. An aqueous polymer dispersion according to claim 7, wherein the reaction product B contains on average per molecule from 0.8 to 1.3 ethylenically unsaturated groups.

15. A process according to claim 9, wherein the layers are applied to at least a portion of a surface of a motor vehicle.

* * * * *